(12) United States Patent
Tsataros

(10) Patent No.: US 6,338,278 B1
(45) Date of Patent: Jan. 15, 2002

(54) FLOW DETECTOR TO MONITOR A NUMBER OF FLOW EVENTS OR DURATION

(76) Inventor: Eddie J. Tsataros, 5822 Imperial Key, Tampa, FL (US) 33615

( * ) Notice: Subject to any disclaimer, the term of this patent is extended or adjusted under 35 U.S.C. 154(b) by 0 days.

(21) Appl. No.: 09/447,921

(22) Filed: Nov. 23, 1999

(51) Int. Cl.[7] .............................. G01F 1/24; G08B 21/00
(52) U.S. Cl. .............................. 73/861.56; 73/861.57; 340/607
(58) Field of Search ..................... 73/861.56, 861.57; 340/606, 607

(56) References Cited

U.S. PATENT DOCUMENTS

| | | | | |
|---|---|---|---|---|
| 2,772,409 A | * | 11/1956 | Reid ......................... | 340/611 |
| 2,803,718 A | * | 8/1957 | Bloom et al. ............. | 200/82 C |
| 2,826,754 A | * | 3/1958 | Carignan ................... | 340/607 |
| 3,678,881 A | * | 7/1972 | Shinn ........................ | 73/28.01 |
| 3,934,238 A | * | 1/1976 | Pavlou ...................... | 340/611 |
| 4,181,835 A | * | 1/1980 | Stadler et al. ............. | 240/610 |
| 4,183,029 A | * | 1/1980 | Isayama et al. ........... | 340/607 |
| 4,423,751 A | * | 1/1984 | Roettgen ................... | 137/557 |
| 4,663,613 A | * | 5/1987 | Raleigh et al. ............ | 340/607 |
| 4,937,558 A | * | 6/1990 | Robinet et al. ............ | 340/606 |

* cited by examiner

Primary Examiner—Harshad Patel
(74) Attorney, Agent, or Firm—Arthur W. Fisher, III

(57) ABSTRACT

A flow detector to detect and monitor the flow of fluid through a conduit comprising a first flow detection element selectively moveable between a first position and a second position and a second flow detection element disposed to operatively engage the first flow detection element when in the second position coupled between a power source and a flow detection monitor such that when fluid flows through the conduit the first flow detection element moves from the first position to the second position to operatively engage the second flow detection element to activate the flow detection monitor and when fluid ceases to flow through the conduit the first flow detector element returns to the first position thereby disengaging the second flow detector element to deactivate the flow detection monitor.

11 Claims, 2 Drawing Sheets

FLOW DETECTOR TO MONITOR A NUMBER OF FLOW EVENTS OR DURATION

BACKGROUND OF THE INVENTION

1. Field of the Invention

A flow detector to detect and monitor the flow of fluid through a conduit.

2. Description of the Prior Art

U.S. Pat. No. 4,183,029 shows an ink filter clogging sensor and indicator for a ink filter disposed in an ink supply conduit. A first and second electrode are disposed in the conduit upstream and downstream of the filter respectively. A sensor means measures an electrical parameter such as the electrical resistance, capacitance or the like between the electrodes which varies as a function of the degree of clogging of the filter. An indicator such as a light analog meter or the like indicates the magnitude of the electrical parameter and thereby indicate the degree of clogging of the filter.

U.S. Pat. No. 2,826,754 teaches an oil failure indicator apparatus. The outlet of the indicator mechanism is connected to a fluid line leading to a device to which the fluid under pressure is delivered. The fluid from the line enters the inlet port and is admitted to the axial bore in a piston. Since the only outlet is through radial passages so long as these passages are located within the bore, fluid cannot pass through the interior chamber to the outlet port. However, whenever sufficient pressure is built up by the pump, the resistance of the spring will be overcome, and the piston will move until the radial passages enter the interior chamber. Since this chamber is of greater diameter than that of the bore, fluid will then pass outwardly through the passages into the chamber and thence through the outlet port. It will be understood that so long as sufficient pressure exists in the line to overcome the resistance of the spring no current can flow from the battery to the lamp, inasmuch as the contact disk is normally insulated by the washers which are connected to the grounded side of the battery. However, if the pressure in the line should fall below the value necessary to maintain the piston in the position shown, or if for any reason there should be a stoppage in the line, the spring will return the piston until the axial bore engages with the annular portion of the contact which will complete the circuit for lighting the lamp, or actuating any other type of warning device which may be in the circuit.

U.S. Pat. No. 2,772,409 comprises a pressure responsive flow indicator for use between a relief valve and an outlet pipe, including a housing containing a movable plug, fluid inlet and outlet openings in the housing at opposite ends of the plug, means urging the plug resiliently in one directions, means to operate a warning device when the plug is moved in the opposite direction, and a conduit through the plug and/or between the plug and the housing.

U.S. Pat. No. 4,181,835 shows a gas flow indicator including an open-ended cylinder, a piston constrained within the cylinder to move between the ends thereof, and a reed switch positioned on the outside of the cylinder for responding to the position of a magnet secured to the piston. The piston is closed adjacent the output aperture of the cylinder and is open adjacent the input aperture of the cylinder for defining a basin within the piston. A spring is positioned between the piston and the output aperture for forcing the piston away from the output aperture. Gas flowing in through the input aperture forces the piston toward the output aperture. An indication of the state of gas flow through the cylinder is provided in accordance with whether the switch is open or closed.

U.S. Pat. No. 2,826,754 relates to fluid circulating systems responsive to a change of pressure in an oil circulating system for automobiles, diesel engines, oil burners and the like whereby a warning such as a signal lamp, a buzzer or other device will be actuated as a result of a predetermined change in such pressure.

U.S. Pat. No. 4,423,751 describes a "snap action" early warning bypass valve assembly responsive to fluid pressure differentials and/or low pressure that functions as both an electrical switch to provide an indication of low pressure or an impending fluid bypass and as a mechanical valve to actually implement the fluid bypass. The valve assembly includes a sealing piston supported by a retaining surface having a central bore formed therein. The sealing piston contains a bypass aperture and is shaped to present a differential sealing area to fluid circulating within the central bore. A spring-biased bypass disc covers the bypass aperture to present a central sealing area to fluid within the central bore. A first pressure differential acting simultaneously across the central and differential sealing areas forces piston into contact with an electrical terminal pin thus energizing an alarm circuit. A second, greater pressure differential acting across the central sealing area alone pushes the bypass disc away from the bypass aperture to complete the bypass operation. A low pressure sensing means including a low pressure piston biased to a no alarm position by spring and to an alarm position by spring is responsive to fluid pressure in a bypass conduit below a predetermined level to energize the same alarm circuit.

U.S. Pat. No. 4,663,613 shows a tub supplied with hot water through a water circulation system including a pump, a water filter and an electric flow-through heater energized through an electric contactor upon closure thereof. A user of the tub is urged to service the water circulation system upon clogging thereof. For this purpose, water flow fluctuations occurring in the circulation system upon restrictions of the water circulation system are sensed and closure of the contactor is precluded for a time interval of predetermined duration in response to a sensing of water flow fluctuations. That predetermined duration is made sufficiently short for a resumption of the heater energization through reclosure of the contactor if the fluctuations are only transient, but sufficiently long to effect the reduction of water temperature in the tub supplied through the heater by restricting reclosure of the contractor as long as the fluctuations continue, so as to indicate to the user of the tub through the reduced water temperature a need to service the water circulation system.

U.S. Pat. No. 2,803,718 comprises a spring-loaded, pressure-responsive piston operatively connected to a snap-acting electric switch, provides all the desirable characteristics in a light, compact unit capable of easy manufacture. The switch embodies means for limiting the movement of the piston so that a momentary high pressure surge will not damage the mechanism, as frequently occurs in the previous Bourdon or diaphragm type pressure devices. The same movement limiting means enables the switch to respond to a pressure stimulus almost instantaneously, there being no necessity for the piston to travel through a relatively long path to reach its proper operating point.

French 1,449,240 is an additional example of the prior art.

SUMMARY OF THE INVENTION

The present invention relates to a flow detector to detect and monitor the intermittent flow of fluid through a conduit to monitor the progressive life cycle of a filter element or other device operatively coupled to the conduit. The flow detector is operatively coupled to a power source and a flow detection monitor including a logic circuit and a signal device. The logic circuit monitors the progressive number and total duration of intermittent flow events occurring within the conduit over time and compares this data with predetermined values relating to the life cycle performance of the filter element or other structure or device.

The flow detector comprises a first flow detection element comprising a bias such as conductive coil spring operatively engaging a fluid flow control disposed within a housing having an inlet section, a flow detection section and an outlet section. The fluid flow control comprises a piston slidably disposed within a cylinder formed in the flow detection section of the housing. The conductive coil spring is compressed between the piston and a second flow detection element such that in the absence of fluid flow the piston is held in a first or closed position such that the piston blocks the flow of fluid into and through the fluid flow control section of the housing. When fluid flows into the housing, the fluid forces the piston into a second or an open position exposing bypass ports formed in the sidewalls of the cylinder. Fluid then flows through the bypass ports around the exterior surface of the cylinder through the outlet section of the housing and from the flow detector.

The second flow detection element comprises two conductive electrical contacts in operative communication with the power supply and the flow detection monitor. The conductive electrical contacts are offset along the longitudinal axis of the housing relative to each other such that when the first flow detection element is in the first position the conductive coil spring engages only one of the conductive electrical contacts. Fluid flowing through the inlet section of the housing moves the piston from the first or closed position to the second or open position moves the conductive coil spring into operatively engagement with the second conductive electrical contact completing an electrical circuit between the power supply and the flow detection monitor.

The first electrical contact and second conductive electrical contact each comprises a blade extending into the interior of the valve section of the housing in a plane parallel to the flow of fluid. A knife edge is formed in the leading surface of the first electrical contact and the second electrical contact at the point where the conductive electrical contacts engage the metallic coil spring to facilitate a self scouring of scale and mineral deposits on the contacts and spring at the point of engagement.

Upon the completion of the electrical circuit, the logic circuit increments a first memory storage register reflecting the total number of flow events detected in the housing. While the circuit within the flow detector remains closed, the logic circuit continually increments a second memory storage register with a value corresponding to the total duration of all flow events which have been detected within the housing. As the logic circuit increments the first and second memory storage registers, the logic circuit compares the value of the first memory storage register representing the total number of flow events detected with the value of a third memory storage register relating to a predetermined number of flow events for which the filter element is designed. Concurrently, the logic circuit compares the value of the second memory storage register reflecting the total duration of all flow events detected within the housing to the value of a fourth memory storage register relating to a predetermined duration of flow for which the filter element is designed. When the value of the first memory storage register exceeds the predetermined value of the third memory storage register or the value of the second memory storage register exceeds of the predetermined fourth memory storage register, the logic circuit activates or actuates the signal device comprising a lamp, horn or other similar signal means to notify the user that the life cycle design parameters of the filter element have been exceeded and therefor the filter element should be replaced. At the time the filter element is replaced, the logic circuit is powered down thereby resetting the values of the first and second memory storage registers to zero for proper monitoring of the life cycle of the replacement filter element.

The invention accordingly comprises the features of construction, combination of elements, and arrangement of parts which will be exemplified in the construction hereinafter set forth, and the scope of the invention will be indicated in the claims,

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF INVENTION

Figure 1:
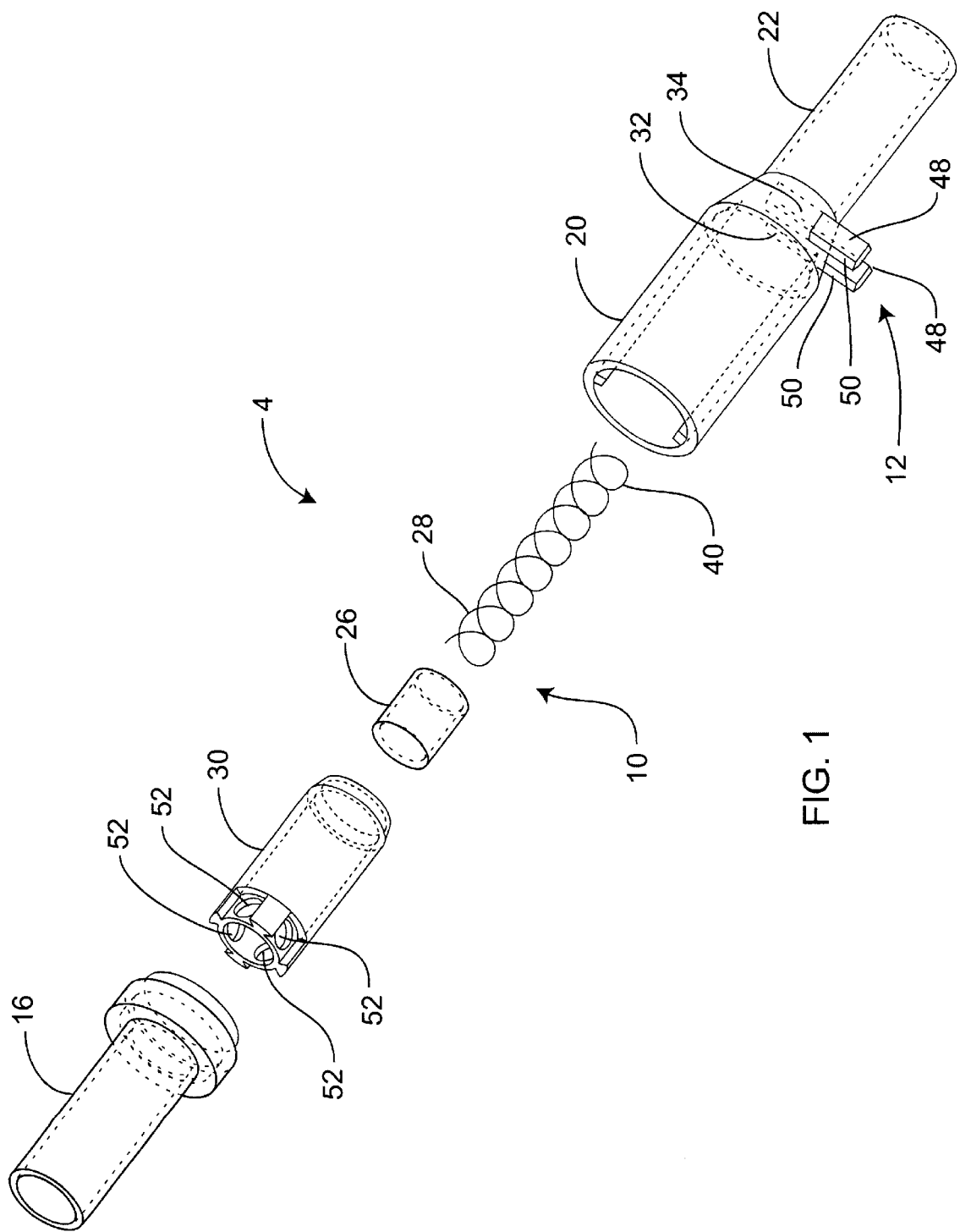
FIG. 1 is an exploded perspective view of the flow detector of the present invention.
Figure 3:
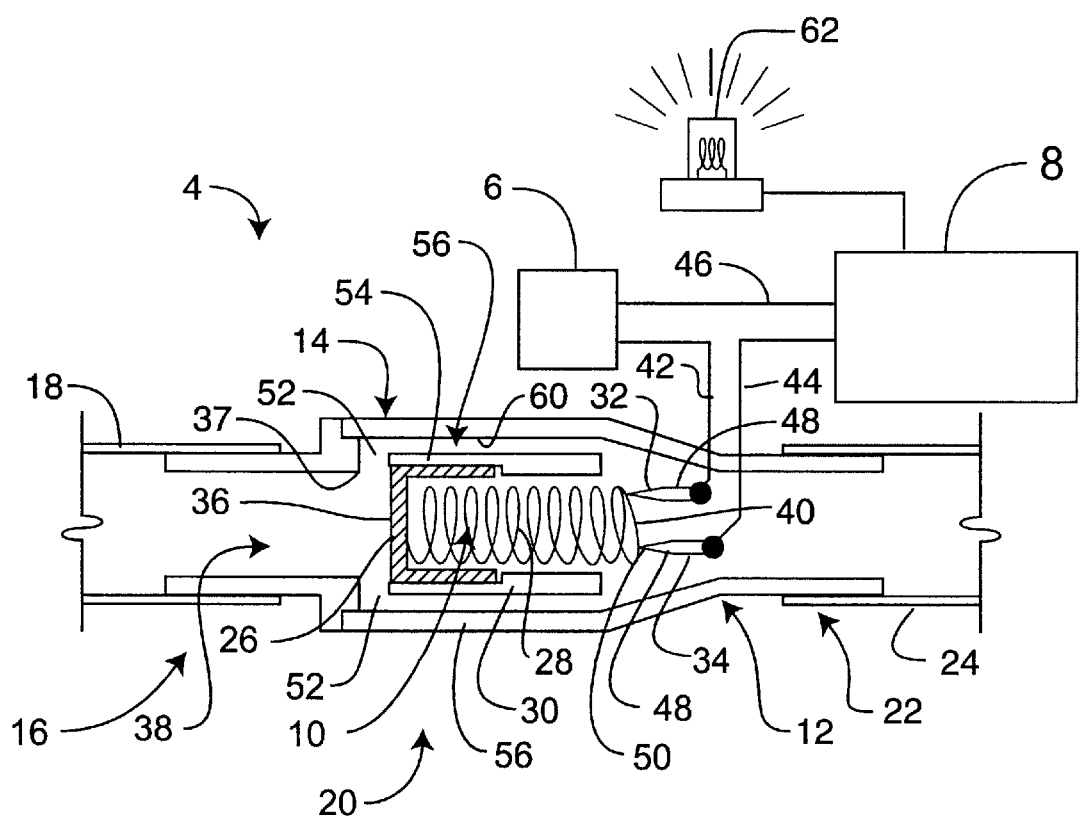
FIG. 3 is a cross-sectional side view of the flow detector of the present invention with the first flow detection element in the second position.

As shown in FIGS. 1 and 3, the present invention relates a flow detector indicated as 4 to detect and monitor the intermittent flow of fluid through a conduit to monitor the progressive life cycle of a filter element or other device operatively coupled to the conduit. The flow detector 4 is operatively coupled to a power source 6 and a flow detection monitor 8. The flow detection monitor 8 includes a logic circuit which monitors the progressive number and total duration of intermittent flow events occurring within the conduit over time and compares this data with predetermined values relating to the life cycle performance of the filter element or other such structure and a signal device to provide an indication when at least one of the predetermined value is exceeded.

The flow detector 4 comprises a first flow detection element generally indicated as 10 selectively moveable between a first or open position and a second or closed position and a second flow detection element generally indicated as 12 each disposed within a housing generally indicated as 14. The housing comprises an inlet section generally indicated as 16 operatively coupled to a fluid supply conduit 18, a flow detection section generally indicated as 20 and an outlet section generally indicated as 22 coupled to a discharge conduit 24.

The first fluid detection element 10 comprises a hollow piston 26 and an electrically conductive bias or coil spring 28 partially disposed therein within by a hollow cylinder 30 disposed within the flow detection section 20 of the housing 14. The second flow detection element 12 comprises a first electrical contact 32 and a second electrical contact 34 disposed within the flow detection section 20 of the housing 14.

Figure 2:
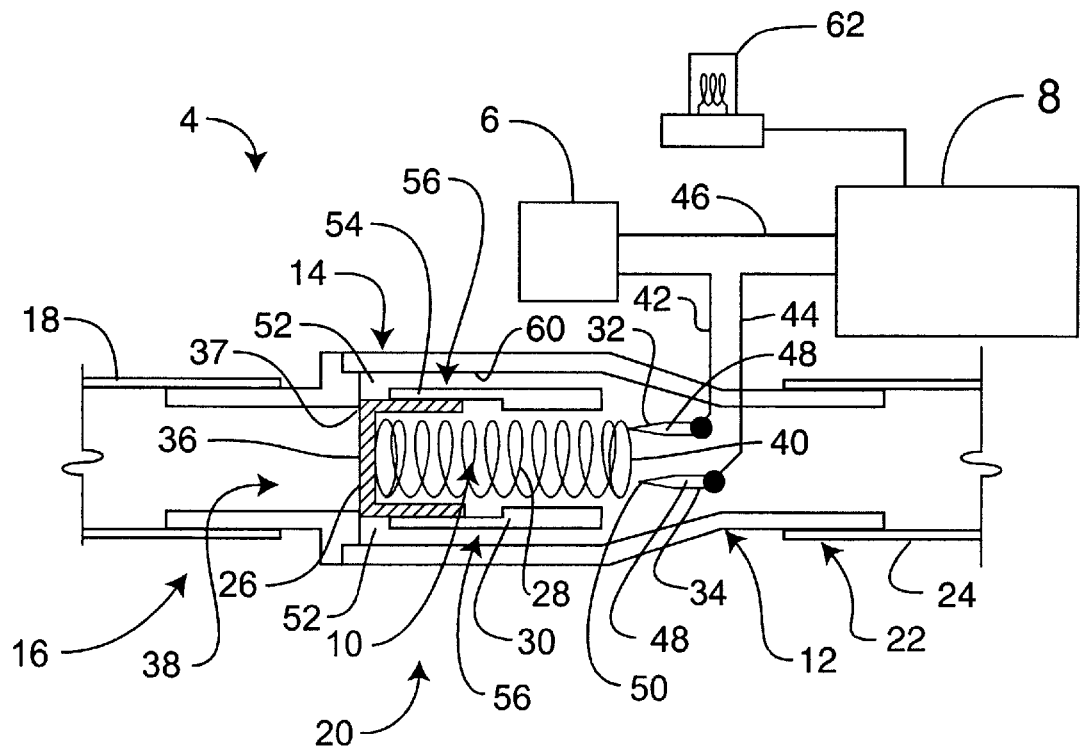
FIG. 2 is a cross-sectional side view of the flow detector of the present invention with the first flow detector element in the first position.

As best shown in FIG. 2, the electrically conductive coil spring 28 is compressed between the piston 26 and the first electrical contact 32 such that the in the absence of fluid flow, the piston 26 is held into the first position. When the piston 26 is in the first position, the base 36 of the piston 26 engages a shoulder 37 formed around an opening 38 between the intake section 16 and the fluid detection section 20 such that even minute quantities of fluid are prevented from entering the fluid detection section 20. The first electrical contact 32 is offset relative to the second electrical contact 34 toward the piston 26 such that when the piston 26 is in the first position, the distal end portion of the electrically conductive coil spring 28 engages only the first electrical contact 32 and disposed in spaced relationship relative to the second electrical contact 34.

As best shown in FIG. 3, when the fluid enters the intake section 16 of the housing 14, the force of the fluid against the base 36 forces the piston 26 to move the hollow cylinder 30 to the second position. As the piston 26 moves to the second position, the force of the piston 26 against the electrically conductive coil spring 28 causes the distal end portion 40 of the electrically conductive coil spring 28 to engage the second electrical contact 34.

As shown in FIGS. 2 and 3, the first electrical contact 32 is electrically coupled to the power source 6 through a first electrical conductor 42 and the second electrical contact 34 is electrically coupled to the flow detection monitor 8 through a second electrical conductor 44. The power source 6 and the flow detection monitor 8 are electrically coupled by a third electrical conductor 46 such that when the electrically conductive coil spring 28 engages the second electrical contact 34, an electrical circuit is completed between the first electrical contact 32 and the second electrical contact 34 across the electrically conductive coil spring 28 thereby establishing a completed electrical circuit between the power source 6 and the flow detection monitor 8 across the first electrical conductor 42, the second electrical conductor 44 and the third electrical conductor 46.

As shown in FIGS. 2 and 3, the first electrical contact 32 and the second electrical contact 34 each comprises a substantially flat conductive member or blade disposed in a substantially parallel relation relative to the longitudinal axis of the housing 14. The front surface 50 of each substantially flat conductive member or blade 48 comprises a relatively sharp leading edge that engages base of distal end portion 40 of the electrically conductive coil spring 28 as described.

As further shown in FIGS. 2 and 3, fluid entering the inlet section 16 of the housing 14 is initially prevented from entering the flow detection section 20 of the housing 14 by the base 36 of piston 26 which is held in the first position (FIG. 2) by the electrically conductive coil spring 28. As the force of the fluid entering the inlet section 16 increases, the resulting force against the base 36 of the piston 26 overcomes the opposing force exerted against the piston 26 such that the piston 26 moves to the second piston (FIG. 3) within the hollow cylinder 30. As the piston 26 is forced into the hollow cylinder 30, fluid flow through a plurality of bypass ports 52 formed in the side wall 54 of the hollow cylinder 30 and the inner surface 60 of the housing 14. The fluid then flows through the bypass channels 56 and the outlet section 22 of the housing 14 into the discharge conduit 24.

In use, the logic circuit within the flow detection monitor 8 monitors the number and duration of fluid flow events through the flow detector 4. The logic circuit increments a first memory storage register reflecting the total number of flow events and continually increments a second memory storage register with a value corresponding to the total duration of all flow events detected. As the logic circuit increments the first and second memory storage registers, the logic circuit continually compares the value of the first memory storage with a third memory storage relating to a predetermined number of flow events for which the filter element is designed. Concurrently, the logic circuit compares the value of the second memory storage register reflecting the total duration of all flow events detected within the housing to the value of a fourth memory storage register relating to a predetermined duration of flow for which the filter element is designed. When the value of the first memory storage register is determined to be in excess of the value of the third memory storage register or the value of the second memory storage register is determined to be in excess of the fourth memory storage register, the logic circuit intermittently activates the flow indicator lamp 62 causing the flow indicator lamp 62 to blink in order to notify the user that the life cycle design parameters of the filter element have been exceeded and therefore the filter element should be replaced. At the time the filter element is replaced, the logic circuit is powered down, thereby resetting the values of the first and second memory storage registers to zero for proper monitoring of the life cycle of the replacement filter element.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A flow detector to detect and monitor the flow of fluid through a conduit comprising a housing to at least partially house a first flow detection element selectively moveable between a first position and a second position and a second flow detection element disposed to operatively engage said first flow detection element when in the second position coupled between a power source and a flow detection monitor such that when fluid flows through the conduit said first flow detection element moves from the first position to the second position to operatively engage said second flow detection element to activate the flow detection monitor and when fluid ceases to flow in the conduit said first flow detector element returns to the first position thereby disengaging said second flow detector element to deactivate said flow detection monitor, said first fluid detection element comprises a piston and an electrically conductive bias including a distal end portion operatively engaged therewith and said second flow detection element comprises a first electrical contact and a second electrical contact, said electrically conductive bias is disposed between said piston and said first electrical contact such that in the absence of fluid flow said piston is held into said first position, said first electrical contact is offset relative to said second electrical contact such that when said piston is in said first position, said distal end portion of said electrically conductive bias engages said first electrical contact and disposed in spaced relationship relative to said second electrical contact wherein fluid flow through said housing forces said piston to move to said second position causing distal end portion of said electrically conductive bias to engage said second electrical contact to activate said flow detection monitor, said first electrical contact and said second electrical contact each comprises substantially flat conductive member having a forward surface disposed in a substantially parallel relationship relative to the longitudinal axis of said housing, said forward surface of each said substantially flat conductive member comprises a relatively sharp leading edge and said flow detection monitor includes a means to count the number of flow events detected and a logic circuit to compare the total number of flow events detected to a predetermined number of flow events and to generate a signal when the predetermined number of flow events is detected to provide an indication thereof.

2. The flow detector of claim 1 wherein said housing comprises an inlet section coupled to a fluid supply conduit, an outlet section coupled to a discharge conduit and a flow detection section operatively coupled between said inlet section and said outlet section.

3. The flow detector of claim 1 wherein said flow detection monitor includes a means to count the total duration of flow events detected and a logic circuit to compare the total duration of the flow events detected to a predetermined duration of flow events and to generate a signal when the predetermined duration of flow events is detected to provide an indication thereof.

4. A flow detector to detect and monitor the flow of fluid through a conduit comprising a housing to at least partially house a first flow detection element selectively moveable between a first position and a second position and a second flow detection element disposed to operatively engage said first flow detection element when in the second position coupled between a power source and a flow detection monitor such that when fluid flows through the conduit said first flow detection element moves from the first position to the second position to operatively engage said second flow detection element to activate the flow detection monitor and when fluid ceases to flow in the conduit said first flow detector element returns to the first position thereby disengaging said second flow detector element to deactivate said flow detection monitor, said flow detection monitor includes a means to count the number of flow events detected and a logic circuit to compare the total number of flow events detected to a predetermined number of flow events and to generate a signal when the predetermined number of flow events is detected to provide an indication thereof.

5. The flow detector of claim 4 wherein said flow detection monitor includes a means to count the total duration of flow events detected and a logic circuit to compare the total duration of the flow events detected to a predetermined duration of flow events and to generate a signal when the predetermined duration of flow events is detected to provide an indication thereof.

6. A flow detector to detect and monitor the flow of fluid through a conduit comprising a housing to at least partially house a first flow detection element selectively moveable between a first position and a second position and a second flow detection element disposed to operatively engage said first flow detection element when in the second position coupled between a power source and a flow detection monitor such that when fluid flows through the conduit said first flow detection element moves from the first position to the second position to operatively engage said second flow detection element to activate the flow detection monitor and when fluid ceases to flow in the conduit said first flow detector element returns to the first position thereby disengaging said second flow detector element to deactivate said flow detection monitor, said flow detection monitor includes a means to count the total duration of flow events detected and a logic circuit to compare the total duration of flow events detected to a predetermined duration of flow events and to generate a signal when the predetermined duration of flow events is detected to provide an indication thereof.

7. The flow detector of claim 6 wherein said flow detection monitor includes a means to count the number of flow events detected and a logic circuit to compare the total number of flow events detected to a predetermined number of flow events and to generate a signal when the predetermined number of flow events is detected to provide an indication thereof.

8. A flow detector to detect and monitor the flow of fluid through a conduit comprising a housing to at least partially house a first flow detection element selectively moveable between a first position and a second position and a second flow detection element disposed to operatively engage said first flow detection element when in the second position coupled between a power source and a flow detection monitor such that when fluid flows through the conduit said first flow detection element moves from the first position to the second position to operatively engage the second flow detection element to activate the flow detection monitor and when fluid ceases to flow through the conduit said first flow detector element returns to the first position thereby disengaging the second flow detector element to deactivate the flow detection monitor, said first fluid detection element comprises a piston and an electrically conductive bias including a distal end portion operatively engaged therewith and said second flow detection element comprises a first electrical contact and a second electrical contact, said first electrical contact and said second electrical contact each including a forward surface, said electrically conductive bias is disposed between said piston and said first electrical contact such that in the absence of fluid flow said piston is held into said first position, said first electrical contact is offset relative to said second electrical contact such that when said piston is in said first position, said distal end portion of said electrically conductive bias engages said first electrical contact and disposed in spaced relationship relative to said second electrical contact, said forward surface of said first electrical contact and said second electrical contact comprises a relatively sharp leading edge, said flow detection monitor includes a means to count the number of flow events detected and a logic circuit to compare the total number of flow events detected to a predetermined number of flow events and to generate a signal when the predetermined number of flow events is detected to provide an indication thereof.

9. The flow detector of claim 8 wherein said flow detection monitor includes a means to count the total duration of flow events detected and a logic circuit to compare the total duration of the flow events detected to a predetermined duration of flow events and to generate a signal when the predetermined duration of flow events is detected to provide an indication thereof.

10. A flow detector to detect and monitor the flow of fluid through a conduit comprising a housing to at least partially house a first flow detection element selectively moveable between a first position and a second position and a second flow detection element disposed to operatively engage said first flow detection element when in the second position coupled between a power source and a flow detection monitor such that when fluid flows through the conduit said first flow detection element moves from the first position to the second position to operatively engage the second flow detection element to activate the flow detection monitor and when fluid ceases to flow through the conduit said first flow detector element returns to the first position thereby disengaging said second flow detector element to deactivate the flow detection monitor, said first fluid detection element comprises a piston and an electrically conductive bias including a distal end portion operatively engaged therewith and said second flow detection element comprises a first electrical contact and a second electrical contact said first electrical contact and said second electrical contact each including a forward surface, said electrically conductive bias is disposed between said piston and said first electrical contact such that in the absence of fluid flow said piston is held into said first position, said first electrical contact is offset relative to said second electrical contact such that when said piston is in said first position, said distal end portion of said electrically conductive bias engages said first electrical contact and disposed in spaced relationship relative to said second electrical contact said forward surface of said first electrical contact and said second electrical contact comprises a relatively sharp leading edge, said flow detection monitor includes a means to count the total duration of flow events detected and a logic circuit to compare the total duration of the flow events detected to a predetermined duration of flow events and to generate a signal when the predetermined duration of flow events is detected to provide an indication thereof.

11. The flow detector of claim 10 wherein said flow detection monitor includes a means to count the total duration of flow events detected and a logic circuit to compare the total duration of the flow events detected to a predetermined duration of flow events and to generate a signal when the predetermined duration of flow events is detected to provide an indication thereof.

* * * * *